United States Patent
Masuda et al.

(10) Patent No.: US 9,618,954 B2
(45) Date of Patent: Apr. 11, 2017

(54) VEHICLE CHARGING SYSTEM AND VEHICLE CHARGING METHOD WITH FIRST AND SECOND CHARGING OPERATIONS

(75) Inventors: Tomokazu Masuda, Kasugai (JP); Tatsuo Hidaka, Anjo (JP); Sumikazu Shamoto, Nagoya (JP); Naoki Kanie, Okazaki (JP); Kiyohito Machida, Togo-cho (JP); Kazuhiko Matsuda, Koganei (JP)

(73) Assignees: TOYOTA JIDOSHA KABUSHIKI KAISHA, Toyota (JP); FUJI JUKOGYO KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 14/349,580

(22) PCT Filed: Oct. 7, 2011

(86) PCT No.: PCT/JP2011/073205
§ 371 (c)(1),
(2), (4) Date: Apr. 3, 2014

(87) PCT Pub. No.: WO2103/051151
PCT Pub. Date: Apr. 11, 2013

(65) Prior Publication Data
US 2014/0236379 A1    Aug. 21, 2014

(51) Int. Cl.
*G05F 1/66* (2006.01)
*H01M 10/44* (2006.01)
(Continued)

(52) U.S. Cl.
CPC ............. *G05F 1/66* (2013.01); *B60L 11/1811* (2013.01); *B60L 11/1862* (2013.01);
(Continued)

(58) Field of Classification Search
CPC .... G05F 1/66; B60L 11/1811; B60L 11/1862; B60L 2250/14; H01M 10/46;
(Continued)

(56) References Cited

U.S. PATENT DOCUMENTS

| 5,650,710 A | 7/1997 | Hotta |
| 2009/0021218 A1 | 1/2009 | Kelty et al. |

(Continued)

FOREIGN PATENT DOCUMENTS

| JP | 2002-142378 A | 5/2002 |
| JP | B2-3554057 | 8/2004 |

(Continued)

OTHER PUBLICATIONS

Partial translation of the Written Opinion of the International Searching Authority issued in PCT/JP2011/073205 mailed Dec. 27, 2011.

*Primary Examiner* — Mohammad Ali
*Assistant Examiner* — Bernard G Lindsay
(74) *Attorney, Agent, or Firm* — Oliff PLC

(57) ABSTRACT

In response to connection of a vehicle with an external power supply, a plug ECU (PLG-ECU) performs a first charging operation of controlling a charger using a target value which is set to a state of charge lower than a predetermined full state of charge, until the state of charge of a power storage device reaches the target value. After the state of charge reaches the target value, the PLG-ECU stops charging of the power storage device, and restarts charging of the power storage device so that the state of charge reaches the predetermined full state of charge at a scheduled time to end charging which is specified through the use of an input unit.

6 Claims, 8 Drawing Sheets

(51) Int. Cl.
*H01M 10/48* (2006.01)
*H02J 7/00* (2006.01)
*B60L 11/18* (2006.01)
*H01M 10/46* (2006.01)
*H01M 10/42* (2006.01)

(52) U.S. Cl.
CPC ........... *H01M 10/44* (2013.01); *H01M 10/46* (2013.01); *H01M 10/48* (2013.01); *H02J 7/0073* (2013.01); *B60L 2250/14* (2013.01); *H01M 2010/4271* (2013.01); *H01M 2220/20* (2013.01); *Y02T 10/7005* (2013.01); *Y02T 10/705* (2013.01); *Y02T 10/7044* (2013.01); *Y02T 10/7072* (2013.01); *Y02T 90/127* (2013.01); *Y02T 90/14* (2013.01)

(58) Field of Classification Search
CPC .. H01M 10/48; H01M 10/44; H01M 2220/20; H01M 2010/4271; H02J 7/0073; Y02T 10/7072; Y02T 90/127; Y02T 10/7044; Y02T 10/705
See application file for complete search history.

(56) References Cited

U.S. PATENT DOCUMENTS

| | | | |
|---|---|---|---|
| 2010/0019729 A1 | 1/2010 | Kaita et al. | |
| 2011/0118919 A1 | 5/2011 | Park et al. | |
| 2011/0175576 A1 | 7/2011 | Uesaka et al. | |
| 2012/0283902 A1* | 11/2012 | Kusumi | B60K 6/46 701/22 |
| 2012/0293122 A1* | 11/2012 | Murawaka | B60L 11/1816 320/109 |

FOREIGN PATENT DOCUMENTS

| | | | | |
|---|---|---|---|---|
| JP | 2008-278585 A | 11/2008 | | |
| JP | 2009-106027 A | 5/2009 | | |
| JP | WO 2011061809 A1 * | 5/2011 | ............... | B60K 6/46 |
| JP | A-2011-151891 | 8/2011 | | |
| WO | WO 2010/084598 A1 | 7/2010 | | |
| WO | 2011/073765 A2 | 6/2011 | | |

* cited by examiner

VEHICLE CHARGING SYSTEM AND VEHICLE CHARGING METHOD WITH FIRST AND SECOND CHARGING OPERATIONS

TECHNICAL FIELD

The present invention relates to a vehicle charging system and a vehicle charging method, and more specifically relates to a charging system and a charging method for charging a vehicle, which is mounted with a power storage device, from a source external to the vehicle.

BACKGROUND ART

A vehicle configured to be capable of generating vehicle drive force by means of an electric motor, such as electric vehicle, hybrid vehicle, fuel cell vehicle, and the like, is mounted with a power storage device storing electric power for driving the electric motor. In such a vehicle, electric power is supplied from the power storage device to the electric motor to generate vehicle drive force for the purpose of starting or accelerating the vehicle for example, while electric power regeneratively produced by the electric motor is supplied to the power storage device when the vehicle is traveling on a downhill or decelerating for example.

There has been proposed a vehicle which is of the above-described type and configured to enable its power storage device to be charged from an external power supply such as commercial power supply by being electrically connected to the external power supply (in the following, this manner of charging will also be referred to simply as "external charging"). Such vehicles chargeable by this external charging include some vehicles having a timer charging function which works based on a scheduled time to end charging (or a time to start driving the vehicle next time) set by a user, so that charging will end immediately before the scheduled time to end charging.

For example, Japanese Patent No. 3554057 (PTD 1) discloses an apparatus for controlling charging of a storage battery in an electric vehicle, the apparatus being adapted to control a charger for charging the storage battery in the electric vehicle. Prior to charging, this charging control apparatus disclosed in PTD 1 detects a voltage value of a power supply connected to the charger when a power supply plug mounted on the charger is inserted in a power supply jack and thereby connected to the power supply. Then, a scheduled time to ride in the vehicle is set and thereafter an instruction so start charging is given. In response to this, based on an amount of discharge from the storage battery at the time the instruction to start charging is given, the detected voltage value of the power supply, and a predetermined value of the charging current, the time required for charging is calculated. Further, based on the set scheduled time to ride in the vehicle and the time required for charging, the time to start charging is calculated so that charging will end at the scheduled time to ride in the vehicle. When the time to start charging comes, charging is started with the value of the charging current.

CITATION LIST

Patent Document

PTD 1: Japanese Patent No. 3554057

SUMMARY OF INVENTION

Technical Problem

In the case of the above-described configuration disclosed in PTD 1, until the time to start charging which is calculated based on the time required for charging is reached, charging of the power storage device is not started. Therefore, regarding PTD 1, it is possible that the power storage device has not been charged with electric power which is enough for the vehicle to travel, when a user wants to use the vehicle earlier than the set scheduled time to ride in the vehicle. In such a situation, the drivability of the vehicle could be deteriorated due to shortage of the output electric power from the power storage device. Consequently, the convenience (user-friendliness) of the vehicle could also be ruined.

It is also possible, in the case where supply of electric power to the power storage device is interrupted due to failure of the external power supply, charging of the power storage device cannot be started even when the time to start charging is reached. In such a situation, charging of the power storage device cannot be completed at the scheduled time to ride in the vehicle. Therefore, desired output from the power storage device cannot be ensured and a similar problem to the aforementioned one may occur. Thus, unless external charging is done taking these situations into account, there remains a possibility that the drivability of the vehicle is deteriorated.

Accordingly, the present invention has been made to solve the above problems and an object of the invention is to provide a vehicle charging system that enables the drivability and the convenience of the vehicle to be improved.

Solution to Problem

According to an aspect of the present invention, a vehicle charging system for controlling charging of a power storage device mounted in a vehicle includes: a charger configured to be capable of converting electric power from an external power supply into charging electric power for the power storage device; an input unit for specifying a scheduled time to end charging the power storage device; and a controller for controlling the charger so that a state of charge of the power storage device reaches a predetermined full state of charge. In response to connection of the vehicle with the external power supply, the controller performs a first charging operation of controlling the charger using a target value which is set to a state of charge lower than the predetermined full state of charge, until the state of charge reaches the target value. After the state of charge reaches the target value, the controller stops charging of the power storage device, and restarts charging of the power storage device for performing a second charging operation of controlling the charger so that the state of charge reaches the predetermined full state of charge at the scheduled time to end charging.

Preferably, the controller sets a scheduled time to start the second charging operation based on the scheduled time to end charging and based on a charging period necessary for the state of charge to increase from the target value to the predetermined full state of charge, and restarts charging of the power storage device when the scheduled time to start the second charging operation is reached.

Preferably, in a case where the state of charge is higher than the target value at a time when the external power supply and the vehicle are connected to each other, the controller does not perform the first charging operation but performs the second charging operation.

Preferably, in a case where a total charging period necessary for the state of charge to reach the predetermined full state of charge is longer than a chargeable period from a present time to the scheduled time to end charging, at a time when the external power supply and the vehicle are connected to each other, the controller does not perform the first and second charging operations but controls the charger so that the state of charge reaches the predetermined full state of charge.

Preferably, the controller changes the target value in accordance with a learned value of the state of charge at a time when travel of the vehicle is completed.

Preferably, the controller makes the target value higher as the learned value of the state of charge is higher.

According to another aspect of the present invention, a vehicle charging method for controlling charging of a power storage device mounted in a vehicle is provided. The vehicle includes: a charger configured to be capable of converting electric power from an external power supply into charging electric power for the power storage device; and an input unit for specifying a scheduled time to end charging the power storage device. The vehicle charging method includes the steps of: performing, in response to connection of the vehicle with the external power supply, a first charging operation of controlling the charger using a target value which is set to a state of charge lower than a predetermined full state of charge, until the state of charge reaches the target value; and after the state of charge reaches the target value, stopping charging of the power storage device, and restarting charging of the power storage device for performing a second charging operation of controlling the charger so that the state of charge reaches the predetermined full state of charge at the scheduled time to end charging.

Advantageous Effects of Invention

In accordance with the present invention, the drivability of a vehicle having the timer charging function can be prevented from being ruined due to shortage of output from the power storage device, and therefore, the convenience of the vehicle can be improved.

DESCRIPTION OF EMBODIMENTS

Figure 1:
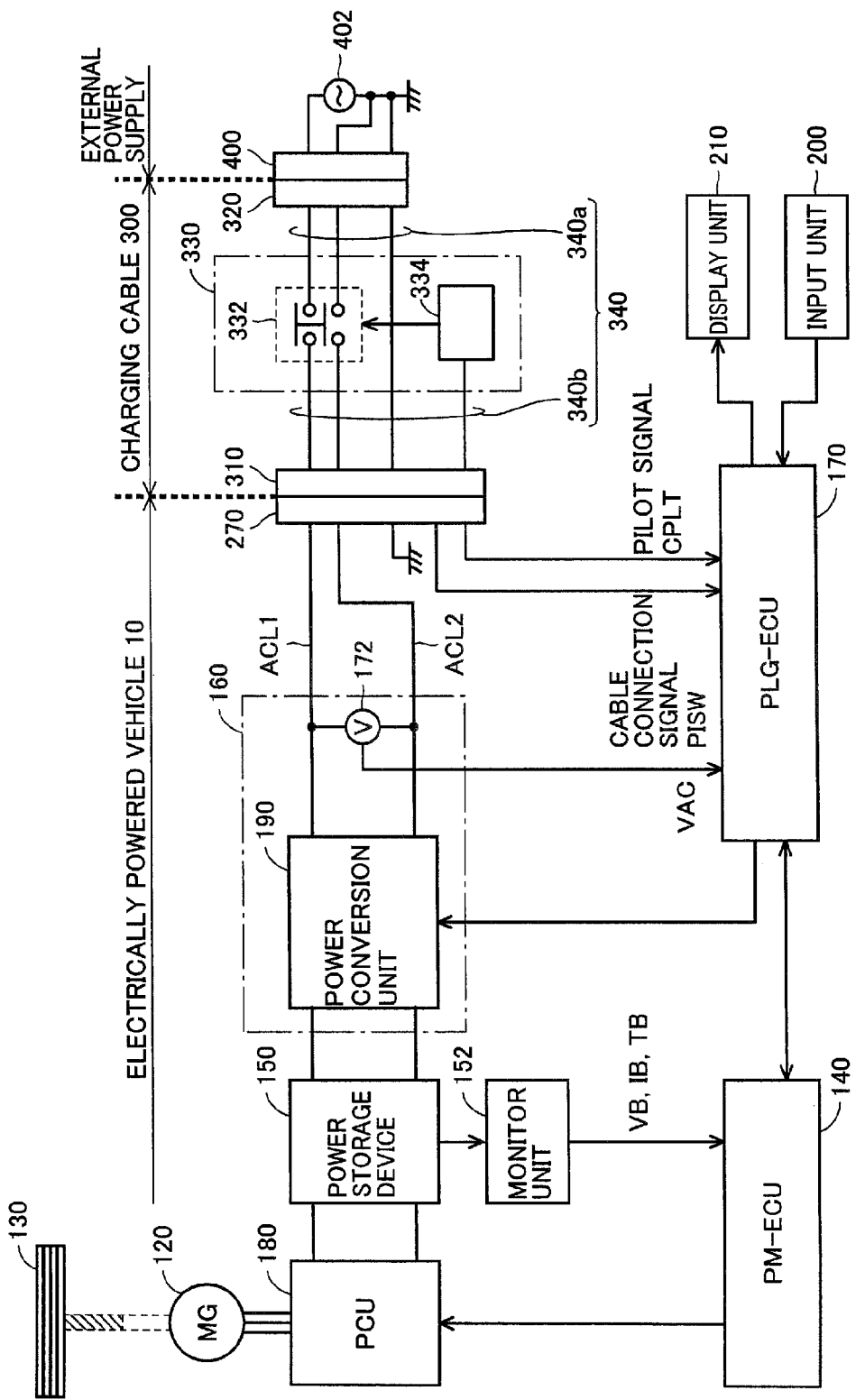
FIG. 1 is a schematic diagram of a charging system for an electrically powered vehicle according to an embodiment of the present invention.

In the following, an embodiment of the present invention will be described in detail with reference to the drawings. In the drawings, the same or corresponding components are denoted by the same reference characters.

FIG. 1 is a schematic diagram of a charging system for an electrically powered vehicle 10 according to the embodiment of the present invention. Electrically powered vehicle 10 is not limited to a particular configuration, as long as electrically powered vehicle 10 is capable of traveling using electric power from a power storage device which is chargeable from an external power supply. Electrically powered vehicle 10 includes hybrid vehicle, electric vehicle, fuel cell vehicle, and the like, for example.

Referring to FIG. 1, electrically powered vehicle 10 includes a power storage device 150 storing electric power to be used for generating vehicle drive force, a motor generator (MG) 120 for generating the drive force, an electric power conversion unit (PCU: Power Control Unit) 180, a drive wheel 130 to which the drive force generated by motor generator 120 is transmitted, an input unit 200, a display unit 210, and a PM (Power Train Management)-ECU (Electronic Control Unit) 140 for controlling the overall operation of electrically powered vehicle 10.

Electrically powered vehicle 10 further includes a vehicle inlet 270 provided in the body of electrically powered vehicle 10, a relay 190, a charger 160 for charging power storage device 150 from an external power supply, and a PLG-ECU 170, which are provided for charging from an external power supply. The external power supply is typically configured as a single-phase AC commercial power supply. It should be noted that, instead of electric power of the commercial power supply or in addition to electric power of the commercial power supply, electric power generated by a solar cell panel installed on a housing roof or the like may be used as the electric power to be supplied from the external power supply.

Power storage device 150 is an electric power storage element configured to be rechargeable, and typically a secondary battery such as lithium ion battery, nickel metal hydride battery or the like is applied for use as the power storage device. Alternatively, an electric power storage element such as electrical double-layer capacitor, other than the battery, may be used to form power storage device 150. In FIG. 1, a system configuration relevant to control of charging and discharging of power storage device 150, in electrically powered vehicle 10, is shown. Power storage device 150 is mounted with a battery sensor (not shown) for detecting voltage VB, current IB, and temperature TB of power storage device 150.

A monitor unit 152 detects status values of power storage device 150, based on the outputs of the battery sensor mounted on power storage device 150. Namely, the status values include voltage VB, current IB, and temperature TB of power storage device 150. As described above, a secondary battery is typically used as power storage device 150, and therefore, voltage VB, current IB, and temperature TB of power storage device 150 will hereinafter be referred to also as battery voltage VB, battery current IB, and battery temperature TB. In addition, battery voltage VB, battery current IB, and battery temperature TB will collectively be referred to also as "battery data." The status values (battery data) of power storage device 150 detected by monitor unit 152 are input to PM-ECU 140.

PCU 180 is configured to perform bidirectional electric power conversion between motor generator 120 and power storage device 150. Specifically, PCU 180 converts DC power from power storage device 150 into AC power for driving motor generator 120. PCU 180 also converts AC power generated by motor generator 120 into DC power for charging power storage device 150.

Motor generator 120 is typically configured in the form of a permanent-magnet-type three-phase synchronous electric motor. The output torque of motor generator 120 is transmitted through a motive power transmission gear (not shown) to drive wheel 130 and thereby causes electrically powered vehicle 10 to travel. Motor generator 120 is capable of generating electric power from rotational force of drive wheel 130 while electrically powered vehicle 10 is regeneratively braked. The generated electric power is then converted by PCU 180 into the charging power for charging power storage device 150.

In a hybrid vehicle mounted with an engine (not shown) in addition to motor generator 120, this engine and motor generator 120 are operated in coordination with each other to thereby generate required vehicle drive force. At this time, electric power generated from rotation of the engine can also be used to charge power storage device 150.

PM-ECU 140 includes a CPU (Central Processing Unit), a memory device, and an input/output buffer (they are not shown), receives a signal from each sensor or the like and outputs a control signal to each device, and controls electrically powered vehicle 10 as well as each device. Control of them is not limited to processing by means of software and it may be processing by means of dedicated hardware (electronic circuit).

PM-ECU 140 controls motor generator 120 and PCU 180 so that vehicle drive force is generated in accordance with a driver's request while electrically powered vehicle 10 is traveling. PM-ECU 140 also controls, in addition to the vehicle drive force, electric power with which power storage device 150 is charged and which is discharged from power storage device 150. In addition, while external charging is performed, PM-ECU 140 operates in coordination with PLG-ECU 170 to control the charging power for power storage device 150 so that power storage device 150 reaches a predetermined full state of charge.

Charger 160 is an apparatus receiving electric power from an external power supply 402 for charging power storage device 150. Charger 160 includes a voltage sensor 172 and an electric power conversion unit 190. Electric power conversion unit 190 is connected to vehicle inlet 270 by electric power lines ACL1, ACL2 through a relay (not shown), and also connected to power storage device 150. Between electric power lines ACL1 and ACL2, voltage sensor 172 is disposed. The value of voltage (voltage supplied from the external power supply) detected by voltage sensor 172, namely VAC, is input to PLG-ECU 170. Cable connection signal PISW and pilot signal CPLT that are output from the charging cable 300 side are input through vehicle inlet 270 to PLG-ECU 170.

Following a control command from PLG-ECU 170, electric power conversion unit 190 converts, into DC power for charging power storage device 150, the AC power which is supplied from external power supply 402 and transmitted through charging cable 300 and through vehicle inlet 270, electric power lines ACL1, ACL2, and the relay.

Figure 2:
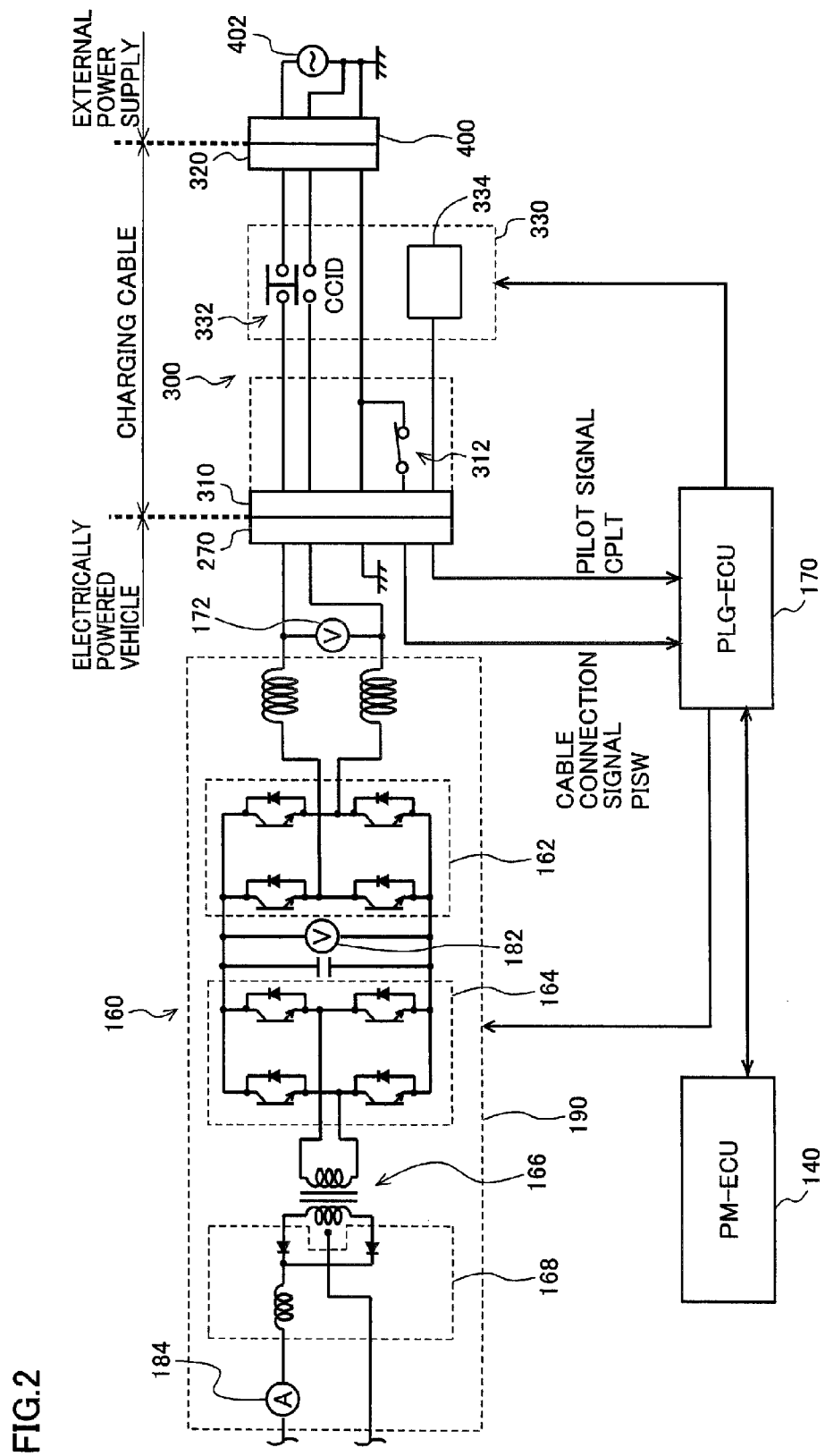
FIG. 2 is a diagram illustrating a configuration of a charger in FIG. 1.

Referring to FIG. 2, charger 160 will be described in further detail. Charger 160 includes voltage sensor 172 and electric power conversion unit 190. Electric power conversion unit 190 includes an AC/DC conversion circuit 162, a DC/AC conversion circuit 164, an isolation transformer 166, and a rectification circuit 168.

AC/DC conversion circuit 162 is formed by a single-phase bridge circuit. AC/DC conversion circuit 162 converts AC power into DC power based on a drive signal from PLG-ECU 170. AC/DC conversion circuit 162 also functions as a voltage boost chopper circuit which boosts voltage by using a coil as a reactor.

DC/AC conversion circuit 164 is formed by a single-phase bridge circuit. DC/AC conversion circuit 164 converts DC power into high-frequency AC power based on a drive signal from PLG-ECU 170 and outputs the AC power to isolation transformer 166.

Isolation transformer 166 includes a core made of a magnetic material as well as a primary coil and a secondary coil wound around the core. The primary coil and the secondary coil are electrically insulated and connected respectively to DC/AC conversion circuit 164 and rectification circuit 168. Isolation transformer 166 converts the high-frequency AC power received from DC/AC conversion circuit 164 into a voltage level in accordance with the turn ratio between the primary coil and the secondary coil, and outputs the resultant AC power to rectification circuit 168. Rectification circuit 168 rectifies the AC power which is output from isolation transformer 166 into DC power.

The voltage between AC/DC conversion circuit 162 and DC/AC conversion circuit 164 (terminal-to-terminal voltage of a smoothing capacitor) is detected by a voltage sensor 182 and input to PLG-ECU 170. The charger 160's output current (corresponding to the charging current for power storage device 150) Ich is detected by a current sensor 184 and input to PLG-ECU 170.

Charging cable 300 includes a vehicle-side charging connector 310, an external-power-supply-side plug 320, a charging circuit interrupt device (CCID) 330, and an electrical wire portion 340 connecting the devices for input/output of electric power and control signals. Electrical wire portion 340 includes an electrical wire portion 340a connecting plug 320 and CCID 330 to each other and an electrical wire portion 340b connecting charging connector 310 and CCID 330 to each other.

Charging connector 310 is configured to be connectable to vehicle inlet 270 provided in the body of electrically powered vehicle 10. For charging connector 310, a switch 312 is provided. Connection of charging connector 310 to vehicle inlet 270 causes switch 312 to be closed, and accordingly cable connection signal PISW indicating that charging connector 310 has been connected to vehicle inlet 270 is input to PLG-ECU 170.

Plug 320 is connected for example to a power supply outlet 400 installed for example in a housing. To power supply outlet 400, AC power is supplied from external power supply 402.

CCID 330 includes a CCID relay 332 and a control pilot circuit 334. CCID relay 332 is provided on a pair of electric power lines in charging cable 300. Turn-on and turn-off of CCID relay 332 are controlled by control pilot circuit 334. While CCID relay 332 is off, the electrical circuit is broken in charging cable 300. On the contrary, when CCID relay 332 is turned on, supply of electric power from external power supply 402 to electrically powered vehicle 10 is enabled.

Control pilot circuit 334 outputs pilot signal CPLT to PLG-ECU 170 of electrically powered vehicle 10 through charging connector 310 and vehicle inlet 270. Pilot signal CPLT is a signal for control pilot circuit 334 to inform PLG-ECU 170 of electrically powered vehicle 10 of the rated current of charging cable 300. More specifically, control pilot circuit 334 includes an oscillator (not shown) and outputs a signal which oscillates at a specified frequency and a specified duty cycle in response to a decrease of the potential of pilot signal CPLT from a specified potential. The duty cycle of pilot signal CPLT is set based on the rated current that can be supplied from external power supply 402 to electrically powered vehicle 10 through charging cable 300. The rated current is specified for each charging cable, and the rated current varies depending on the type of the charging cable. Thus, the duty cycle of pilot signal CPLT also varies depending on the charging cable.

Pilot signal CPLT is also used as a signal for remotely controlling CCID relay 332 from PLG-ECU 170, based on the potential of pilot signal CPLT which is controlled by PLG-ECU 170. Based on a potential change of pilot signal CPLT, control pilot circuit 334 controls turn-on and turn-off of CCID relay 332. Namely, pilot signal CPLT is transmitted and received between PLG-ECU 170 and CCID 330.

PLG-ECU 170 and PM-ECU 140 are connected to each other by means of a communication bus so that bidirectional communication can be performed therebetween. Receiving cable connection signal PISW, pilot signal CPLT, and detected value VAC of voltage sensor 172, PLG-ECU 170 transmits these acquired items of information to PM-ECU 140. While the present embodiment has been described herein with reference to PM-ECU 140 and PLG-ECU 170 that are provided as separate ECUs, an ECU into which respective functions of these ECUs are all integrated may be provided.

PLG-ECU 170 controls operation of charger 160 while external charging is done, based on the acquired information. Specifically, PLG-ECU 170 controls charger 160 in such a manner that causes power storage device 150 to reach a predetermined full state of charge. PLG-ECU 170 generates a control command for giving an instruction to increase or decrease the charging power so that the charging power supplied from charger 160 to power storage device 150 has a predetermined constant value. Accordingly, following the control command from PLG-ECU 170, charger 160 converts electric power from external power supply 402 into electric power which is suitable for charging power storage device 150. Specifically, charger 160 rectifies the voltage supplied from external power supply 402 to thereby generate a DC voltage, and controls charging current Ich supplied to power storage device 150 in accordance with the control command from PLG-ECU 170.

PM-ECU 140 estimates the state of charge (SOC) of power storage device 150 based on battery voltage VB when the charging power has the aforementioned constant value (this VB corresponds to the closed circuit voltage CCV). The SOC is the percentage (0 to 100%) of the currently remaining capacity relative to the full charge capacity. PM-ECU 140 outputs the estimated SOC to PLG-ECU 170. When the SOC reaches a predetermined full state of charge, PLG-ECU 170 outputs a control command to charger 160 for instructing charger 160 to stop charging.

Figure 3:
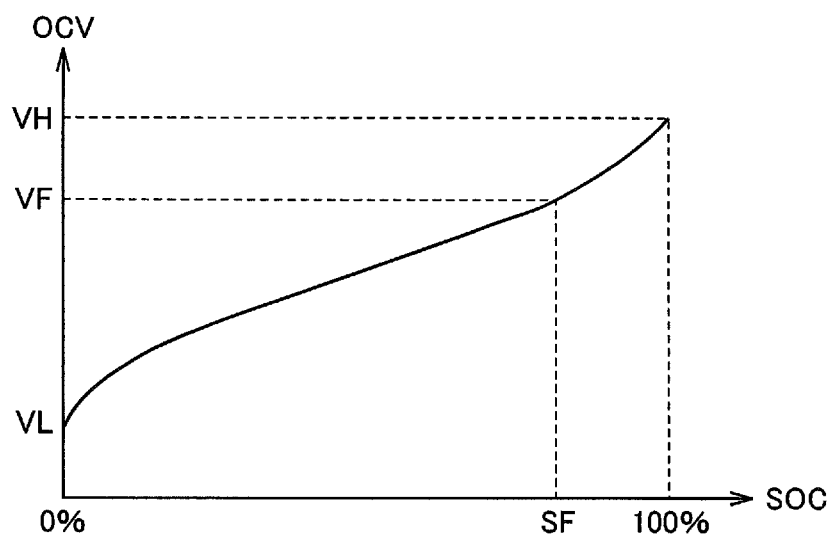
FIG. 3 is a diagram showing a relationship between the open circuit voltage and the state of charge (SOC) of a power storage device.
Figure 4:
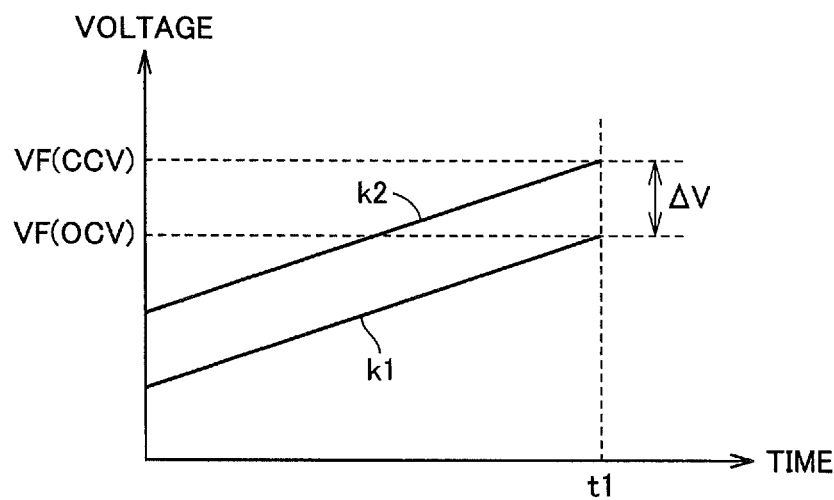
FIG. 4 is a diagram showing a relationship between the open circuit voltage and the closed circuit voltage of the power storage device.

FIGS. 3 and 4 are each a diagram for illustrating how the SOC of power storage device 150 is estimated in the embodiment of the present invention. FIG. 3 is a diagram showing a relationship between the open circuit voltage (OCV) and the SOC of power storage device 150.

Referring to FIG. 3, the SOC of power storage device 150 has a unique relationship with the OCV of power storage device 150. Therefore, when the OCV reaches VF corresponding to the SOC=SF where SF is a predetermined full state of charge, the SOC can be identified as reaching SF.

FIG. 4 is a diagram showing a relationship between the OCV and the CCV of power storage device 150. Referring to FIG. 4, a line k1 represents the OCV of power storage device 150 and a line k2 represents the CCV of power storage device 150. During charging of power storage device 150 where the charging current flows, battery voltage VB detected by the battery sensor is CCV. Due to the influences of internal resistance and polarization of power storage device 150, the CCV is higher by $\Delta V$ than the OCV.

A change of the charging power for power storage device 150 causes $\Delta V$ to change, which therefore makes it difficult to estimate the OCV from the CCV. Accordingly, PLG-ECU 170 controls charger 160 so that the charging power has a predetermined constant value while external charging is performed. PLG-ECU 170 determines in advance $\Delta V$ for the charging power having a predetermined constant value. Then, based on the CCV (battery voltage VB) detected by the battery sensor, PLG-ECU 170 estimates the OCV. More specifically, PLG-ECU 170 determines in advance $\Delta V$ for the charging power having a predetermined constant value and, when battery voltage VB reaches VF (CCV) calculated by adding $\Delta V$ to VF (OCV) which corresponds to the SOC=SF, PLG-ECU 170 determines that the SOC of power storage device 150 reaches a predetermined full state of charge.

Figure 5:
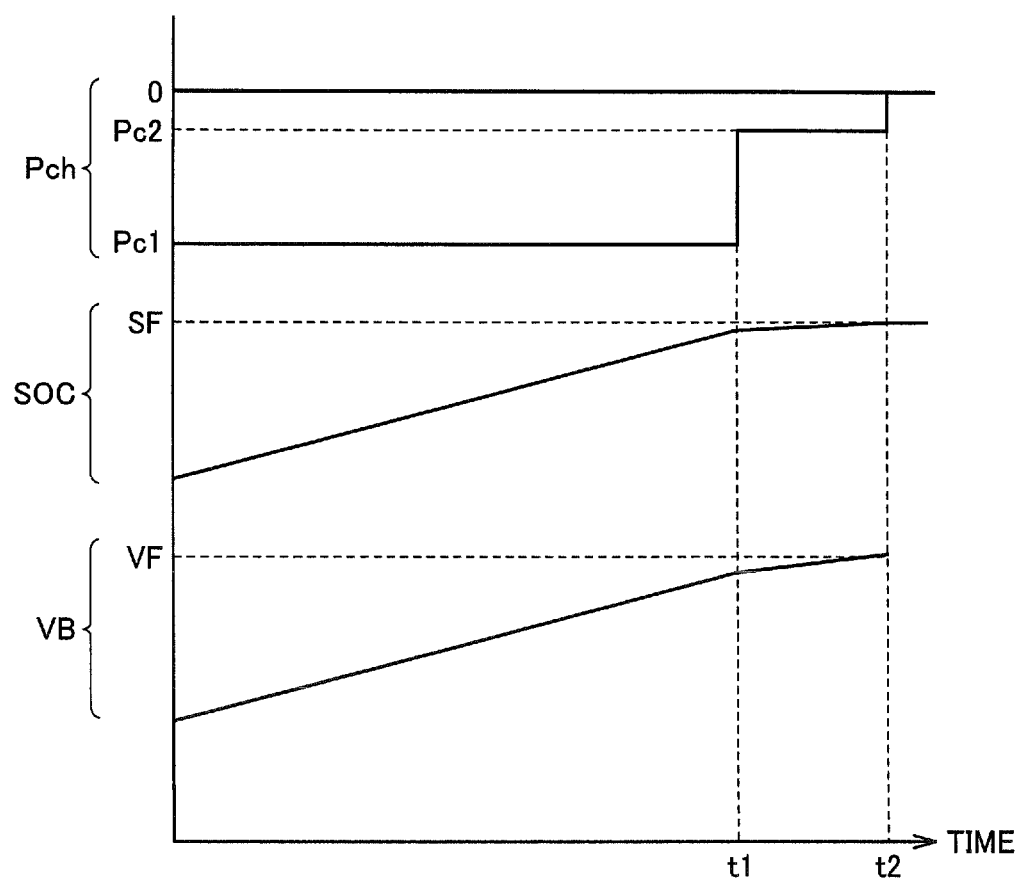
FIG. 5 is a diagram showing changes, with time, of charging power, SOC, and battery voltage of the power storage device while being charged by external charging.

FIG. 5 is a diagram showing changes, with time, of the charging power, the SOC, and battery voltage VB of power storage device 150 while being charged by external charging.

Referring to FIG. 5, charging control for power storage device 150 is performed in two stages. Namely, until time t1 which is immediately before the time when the SOC reaches a predetermined full state of charge SF, constant-electric-power charging (hereinafter also referred to as "CP (Constant Power) charging") is performed using charging power Pch having a constant value Pc1. After time t1, CP charging is performed using charging power Pch having a constant value Pc2 ($|Pc2|<|Pc1|$). Charging power Pch is determined for example based on the electric power which can be supplied from charger 160. Specifically, PLG-ECU 170 determines based on cable connection signal PISW that charging connector 310 of charging cable 300 has been connected to vehicle inlet 270, and accordingly acquires detected value VAC of the voltage from voltage sensor 172. Further, based on the duty cycle of pilot signal CPLT, PLG-ECU 170 acquires the rated current which can be supplied through charging cable 300 to electrically powered vehicle 10. Based on voltage VAC supplied from external power supply 402 and the rated current of charging cable 300, PLG-ECU 170 sets charging power Pch. Constant value Pc1 is set for example to the maximum electric power (rated power of charger 160) which can be supplied from charger 160.

Then, at time t2, battery voltage VB (CCV) reaches VF (CCV) corresponding to the SOC=SF, and it is thus determined that the SOC of power storage device 150 has reached SF and external charging is ended.

Referring back to FIG. 1, display unit 210 is a user interface provided for displaying information to be displayed that is given from PLG-ECU 170, such as charging period of time to be taken for charging power storage device 150 that is calculated by PLG-ECU 170 under timer charging control which will be described later herein, as well as scheduled time to start charging that is set according to the charging period. Display unit 210 includes, for example, an indicator such as display lamp or LED, or a liquid crystal display.

Input unit 200 is a user interface provided for setting a scheduled time to end charging (or a scheduled time to start driving the vehicle next time) under timer charging control described later herein. The scheduled time to end charging that is set by input unit 200 is transmitted to PLG-ECU 170.

While FIG. 1 shows input unit 200 and display unit 210 as separate elements, these elements may be integrated into one element.

Instead of the configuration illustrated in FIGS. 1 and 2, another configuration may be used in which electric power is supplied through electromagnetic coupling between external power supply 402 and electrically powered vehicle 10 which are in non-contact with each other. Specifically, a primary coil may be provided in the external power supply and a secondary coil may be provided in the vehicle and the mutual inductance between the primary coil and the secondary coil may be used so that electric power is supplied from external power supply 402 to electrically powered vehicle 10. For external charging performed in this manner as well, a part of the illustrated configuration, namely the part including charger 160 converting the electric power supplied from external power supply 402 and the subsequent elements, may be provided as a part common to the illustrated configuration and the other configuration.

[Timer Charging Control]

The electrically powered vehicle in the present embodiment is a vehicle which is chargeable by external charging. Therefore, after travel of the vehicle is completed, power storage device 150 can be charged to a maximum extent possible to thereby extend the distance over which the electrically powered vehicle can travel with the electric power stored in power storage device 150.

Meanwhile, it is not generally preferable, in terms of degradation of a secondary battery used typically as the power storage device, that the SOC is kept high for a long period of time. In view of this, in electrically powered vehicle 10 of the present embodiment, charging control (timer charging control) for power storage device 150 is performed based on a scheduled time to end charging that is specified by a user, so that the SOC reaches a predetermined full state of time immediately before the scheduled time to end charging.

Figure 6:
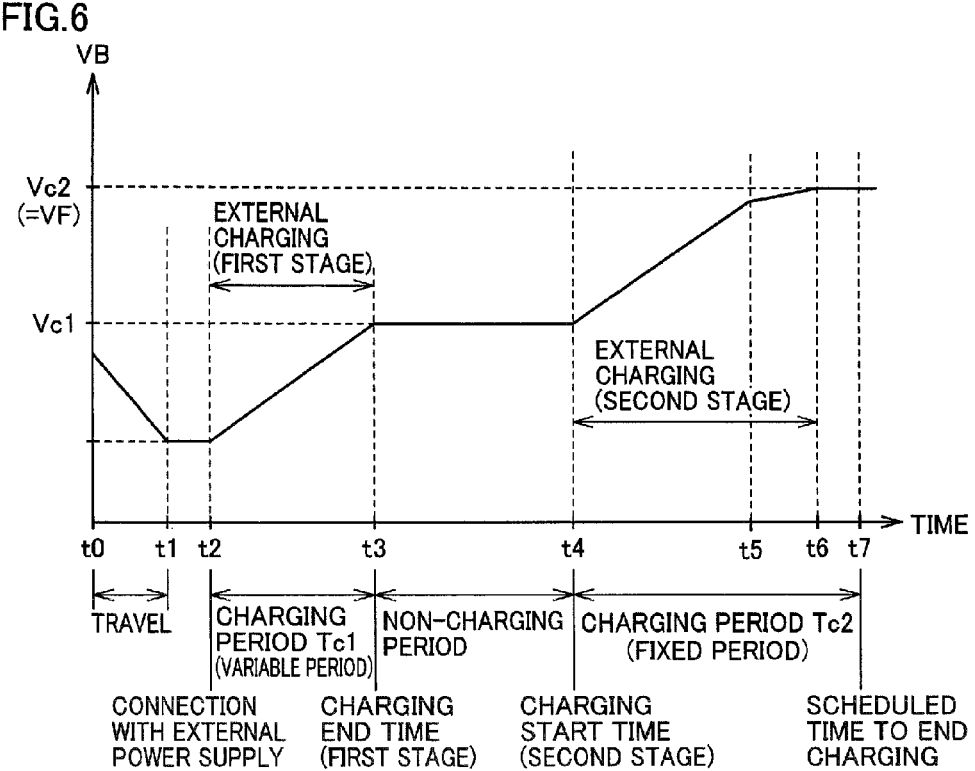
FIG. 6 is a diagram for illustrating timer charging control performed by a plug ECU (PLG-ECU).

FIG. 6 is a diagram for illustrating timer charging control performed by PLG-ECU 170 in the present embodiment. FIG. 6 shows a change, with time, of battery voltage VB of power storage device 150.

Referring to FIG. 6, travel of electrically powered vehicle 10 is completed at time t1. Then, a user connects charging connector 310 of charging cable 300 to vehicle inlet 270 (time t2) to thereby enable vehicle 10 to be charged by external charging. Before time t2 when external charging is enabled, a user sets a scheduled time to end charging (time t7) through the use of input unit 200. Accordingly, PLG-ECU 170 performs timer charging control in such a manner that causes the SOC to reach a predetermined full state of charge SF at time t6 which is immediately before the scheduled time to end charging (time t7).

Specifically, PLG-ECU 170 performs timer charging control for power storage device 150 in two stages. In response to connection between external power supply 402 and electrically powered vehicle 10 (time t2), PLG-ECU 170 starts first-stage charging. As the SOC of power storage device 150 thus starts increasing, battery voltage VB increases.

In this first-stage charging, PLG-ECU 170 causes power storage device 150 to be charged until the SOC reaches a predetermined target value SOC1. Specifically, PLG-ECU 170 sets a target voltage Vc1 to the CCV which is determined by adding ΔV to the OCV corresponding to the SOC=SOC1. Then, PLG-ECU 170 performs CP charging in such a manner that charging power Pch has constant value Pc1 until battery voltage VB reaches target voltage Vc1.

At time t3, battery voltage VB reaches target voltage Vc1 and accordingly PLG-ECU 170 ends the first-stage charging. Then, PLG-ECU 170 starts second-stage charging. The second-stage charging causes the SOC of power storage device 150 to reach SF. Namely, battery voltage VB reaches VF (CCV) corresponding to the SOC=SF.

For the second-stage charging, PLG-ECU 170 sets a target voltage Vc2 to VF (CCV) and causes power storage device 150 to be charged so that battery voltage VB reaches target voltage Vc2 at time t6 which is immediately before the scheduled time to end charging (time t7) which has been set by the user. Specifically, until time t5 which is immediately before the time when battery voltage VB reaches target voltage Vc2, PLG-ECU 170 performs CP charging in such a manner that charging power Pch has constant value Pc1. After time t5, PLG-ECU 170 performs CP charging in such a manner that charging power Pch has constant value Pc2. At time t6, battery voltage VB reaches target voltage Vc2 (=VF (CCV)) and PLG-ECU 170 determines that the SOC of power storage device 150 has reached SF and ends the second-stage charging.

In response to user's specification of the scheduled time to end charging (time t7), PLG-ECU 170 determines a charging schedule of the charging period of time based on a required charging amount of power storage device 150, in order to perform the above-described charging in two stages. Specifically, based on target value SOC1 of the first-stage charging, PLG-ECU 170 calculates a required charging amount ΔQ which is required for charging power storage device 150 so that the SOC increases from SOC1 to SF. This required charging amount ΔQ is calculated by the following Equation (1) where Q represents a full charge capacity of power storage device 150.

$$\Delta Q = Q \times (SF - SOC1)/100 \tag{1}$$

Here, progress of degradation of power storage device 150 causes full charge capacity Q to decrease. In view of this, full charge capacity Q is corrected so that the state of degradation of power storage device 150 is reflected on full charge capacity Q. For example, the integral (actual value) of the charging power for power storage device 150 is calculated, the theoretical value of the charging power is calculated from the SOC which is determined based on the relationship between the OCV and the SOC (FIG. 2), and full charge capacity Q can accordingly be corrected based on the difference between the theoretical value of the charging power and the integral of the charging power.

Further, PLG-ECU 170 calculates charging period Tc2 necessary for the second-stage charging, based on required charging amount ΔQ calculated by the above Equation (1). Charging period Tc2 is calculated by the following Equation (2) where a is the charging efficiency of power storage device 150.

$$Tc2 = \Delta Q/Pch \times \alpha + \Delta Tc \tag{2}$$

The first term of the right side in Equation (2) represents a charging period to be taken for power storage device 150 to be charged with charging power Pch=Pc1, and the second term thereof represents a correction term for the charging period. This correction term ΔTc includes a variation of the charging period depending on temperature TB of power storage device 150, a charging period to be taken for charging power storage device 150 with charging power Pch=Pc2, and a learned correction value, for example. The aforementioned variation of the charging period depending on temperature TB of power storage device 150 is given in consideration of the fact that the charging characteristic of power storage device 150 is influenced by temperature TB of power storage device 150. For example, when the temperature of power storage device 150 is low, electric power acceptable by power storage device 150 decreases, possibly resulting in a longer time taken for charging, as compared with the time taken at normal temperature. The charging period to be taken for charging power storage device 150 with charging power Pch=Pc2 corresponds to the time from time t5 to time t6 shown in FIG. 6. This charging period may also be corrected depending on temperature TB of power storage device 150.

PLG-ECU 170 uses the above Equations (1) and (2) to calculate charging period Tc2 required for charging in the second stage. Here, the target value of the SOC in the first-stage charging is set in advance to SOC1, and therefore, required charging amount ΔQ indicated in Equation (1) is a fixed value. Since required charging amount ΔQ has a fixed value, charging period Tc2 in the second stage indicated in Equation (2) also has a fixed value. Accordingly, in response to the determination that electrically powered vehicle 10 and external power supply 402 are connected to each other by charging cable 300 at time t2, PLG-ECU 170 can calculate charging period Tc2 to be taken for charging in the second stage, taking into consideration the state of degradation and temperature TB for example of power storage device 150. Then, PLG-ECU 170 can subtract charging period Tc2 from time t6 which is immediately before the scheduled time to end charging (time t7) to thereby determine a scheduled time (time t4) to start charging in the second stage.

In the configuration thus given, the first-stage charging ends at time t3, and charging of power storage device 150 is thereafter temporarily stopped for the sake of standby of the second-stage charging, until the scheduled time to start the second-stage charging (time t4). Then, when the scheduled time to start charging (time t4) is reached, charging of power storage device 150 is restarted and the second-stage charging is started. In the period from the end of the first-stage charging (time t3) to the start of the second-stage charging (time t4), the SOC of power storage device 150 is kept at target value SOC1. Therefore, even under the situation that a user wants to start causing the vehicle to travel at a time earlier than the scheduled time to end charging (time t7) which is set in accordance with the scheduled time to start the next drive of the vehicle, the electric power stored in power storage device 150 can be used to cause electrically powered vehicle 10 to travel.

Namely, under the conventional timer charging control, a scheduled time to start charging is determined based on a scheduled time to end charging and a required charging amount, and the power storage device starts being charged when the scheduled time to start charging is reached. Therefore, before the scheduled time to start charging or immediately after the scheduled time to start charging, it is possible that electric power necessary for the vehicle to travel has not been stored in the power storage device and thus the drivability of the vehicle is low due to shortage of output from the power storage device. In contrast, in the charging system of the present embodiment, immediately after electrically powered vehicle 10 and external power supply 402 are connected to each other, the first-stage charging is performed and power storage device 150 is charged with certain electric power. Therefore, even when an urgent request to start travel is given from a user, the request can be met. Accordingly, the convenience of the vehicle is improved.

In another situation where external power supply 402 fails in the period of time from time (time t2) at which external charging is enabled to the scheduled time to end charging (time t7) and thus supply of electric power to power storage device 150 is interrupted, the electric power stored in power storage device 150 by the first-stage charging can be used to still cause electrically powered vehicle 10 to travel. Therefore, the risk of shortage of output from power storage device 150 due to failure of external power supply 402 can be reduced.

Target value SOC1 of the first-stage charging can be set to a value which is as high as possible on condition that degradation of power storage device 150 is not progressed, to thereby ensure sufficient electric power which is output from power storage device 150 with degradation of power storage device 150 suppressed. For example, target value SOC1 can be determined so that electric power required for ordinary use of electrically powered vehicle 10, for example, required for electrically powered vehicle 10 to make a round trip in a daily living area, can be stored in power storage device 150. Alternatively, target value SOC1 may also be determined so that minimum necessary electric power required for travel from a user's house to a nearest dealer is stored in power storage device 150. Namely, target value SOC1 of the first-stage charging can be determined in advance based on predicted power consumption. Alternatively, a user may use input unit 200 to set target value SOC1 to any value.

Further, in the charging system of the present embodiment, the second-stage charging is performed so that the SOC of power storage device 150 reaches a predetermined full state of charge immediately before the scheduled time to end charging, like the conventional timer charging control. The period of time for which the SOC is kept at a high value is thus shortened, and therefore, degradation of power storage device 150 can be suppressed. Namely, the drivability and the convenience of the vehicle can be improved with degradation of power storage device 150 suppressed.

[First Modification]

Figure 7:
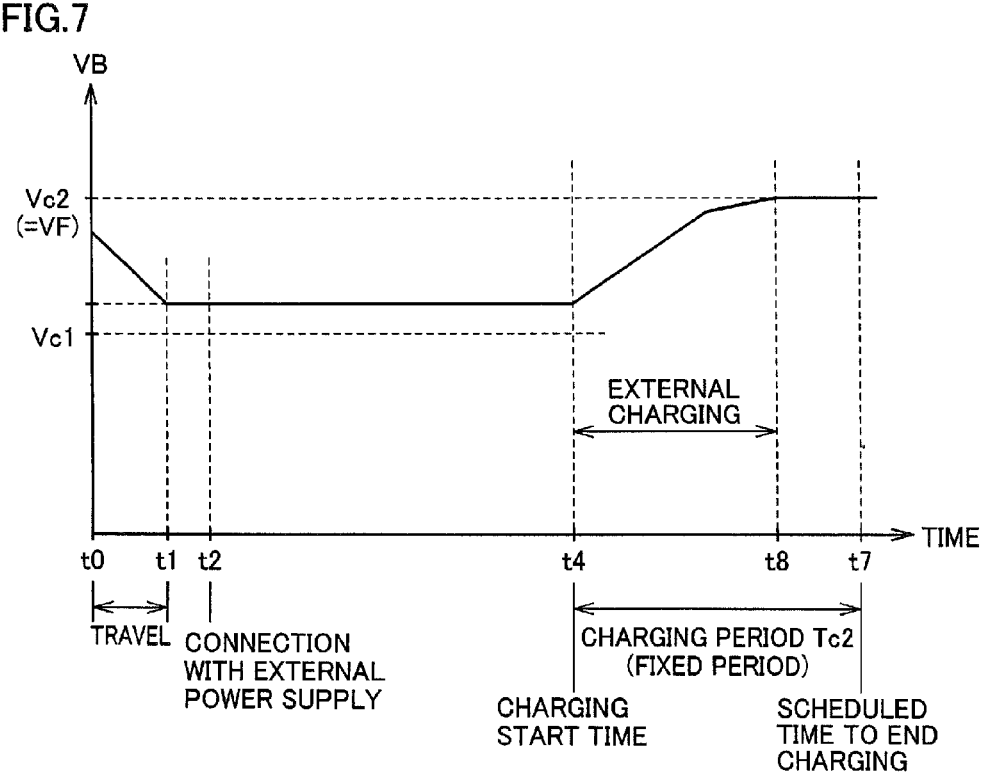
FIG. 7 is a diagram for illustrating a first modification of timer charging control performed by the PLG-ECU.

In the above-described configuration where timer charging control is performed in two stages, it is possible that the SOC of power storage device 150 at the time (time t2 in FIG. 7) when electrically powered vehicle 10 and external power supply 402 are connected to each other by charging cable 300 is higher than target value SOC1 of the first-stage charging. FIG. 7 is a diagram for illustrating a first modification of timer charging control performed by PLG-ECU 170. FIG. 7 shows a change of battery voltage VB of power storage device 150 with time.

Referring to FIG. 7, when it is determined that the SOC of power storage device 150 is higher than target value SOC1 at the time (time t2) when electrically powered vehicle 10 and external power supply 402 are connected to each other by charging cable 300, PLG-ECU 170 does not perform the first-stage charging but causes power storage device 150 to be kept in a charging standby state until a scheduled time to start charging (time t4) is reached. The scheduled time to start charging (time t4) is determined by means of the above Equations (1) and (2) and based on charging period Tc2 (fixed value) which is calculated from required charging amount ΔQ (fixed value) which is required to charge power storage device 150 so that the SOC increases from SOC1 to SF. Charging period Tc2 can thus be set to the fixed value to thereby eliminate the need to re-calculate charging period Tc2 based on the SOC of power storage device 150 at time t2. Accordingly, the control logic for performing timer charging control for power storage device 150 can be simplified.

When the scheduled time to start charging (time t4) is reached, PLG-ECU 170 starts causing power storage device 150 to be charged. Then at time t8, battery voltage VB attains target voltage Vc2 (=VF (CCV)). Then, PLG-ECU 170 determines that the SOC of power storage device 150 has reached SF and causes external charging to end.

The above-described timer charging control in the charging system in the embodiment of the present invention can be summarized in the following process flow.

Figure 8:
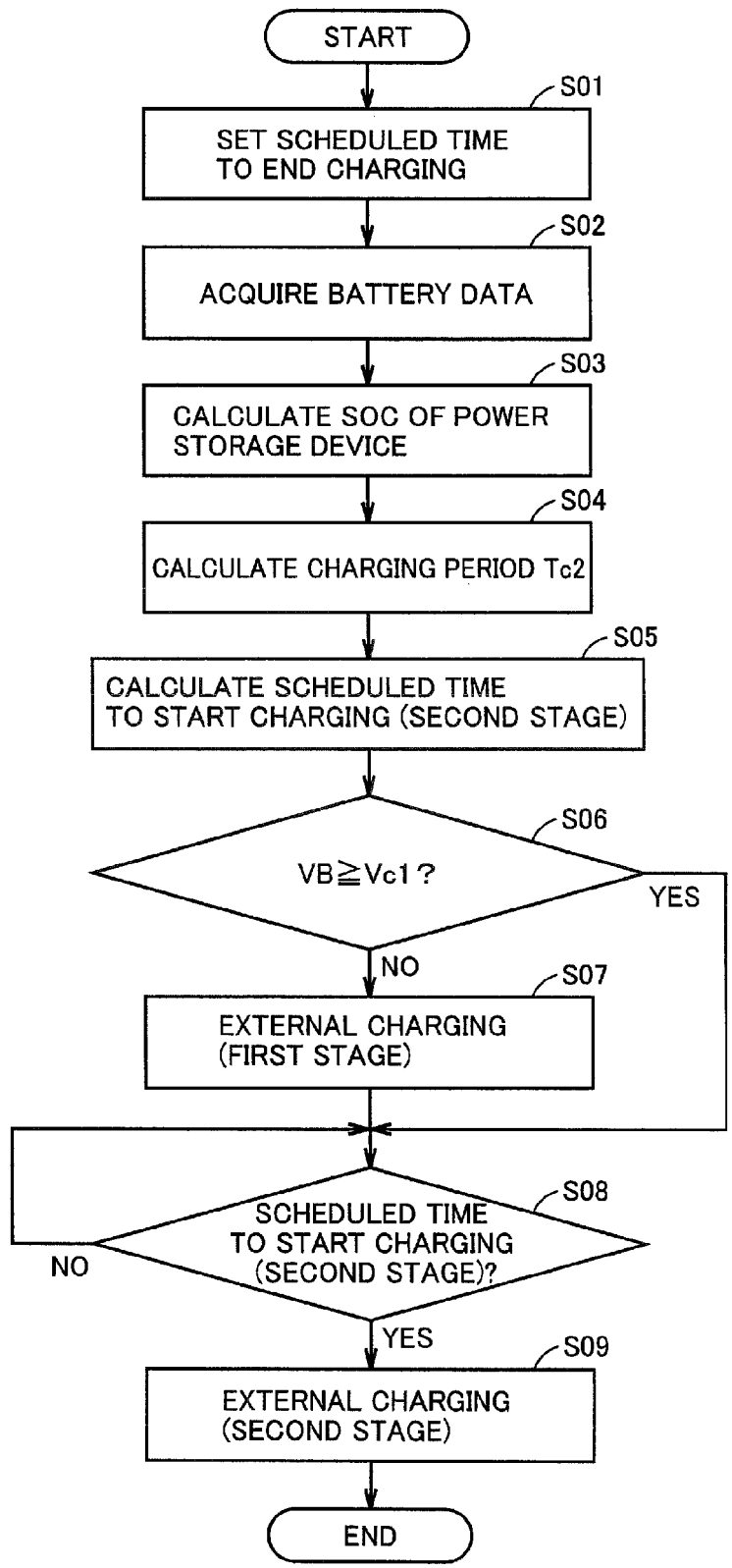
FIG. 8 is a flowchart showing a procedure of a control process for implementing timer charging control in the charging system according to an embodiment of the present invention.

FIG. 8 is a flowchart showing a procedure of a control process for implementing timer charging control in the charging system according to the embodiment of the present invention. The flowchart shown in FIG. 8 can be implemented by execution of a program stored in advance by PLG-ECU 170.

Referring to FIG. 8, in order to perform timer charging control, PLG-ECU 170 first acquires in step S01 a scheduled time to end charging which is set by a user. Further, in step S02, PM-ECU 140 acquires battery data (VB, IB, TB) from monitor unit 152 and calculates, in step S03, the current SOC of power storage device 150 based on the acquired data. PM-ECU 140 transmits the calculated SOC to PLG-ECU 170.

Next, in step S04, PLG-ECU 170 uses the above Equation (1) to calculate required charging amount ΔQ which is required to charge power storage device 150 from target value SOC1 of the first-stage charging to a predetermined full state of charge SF. Then, it assigns the calculated required charging amount ΔQ to Equation (2) to thereby calculate charging period Tc2 to be taken for power storage device 150 to be charged by the second-stage charging.

In step S05, PLG-ECU 170 determines a scheduled time to start charging in the second stage, based on charging period Tc2 calculated in step S04 and the time to end charging which is set by a user.

In step S06, PM-ECU 140 determines whether or not battery voltage VB at the present time is equal to or higher than target voltage Vc1 corresponding to target value SOC1 of the first-stage charging. When battery voltage VB is lower than target voltage Vc1 (NO in step S06), PLG-ECU 170 proceeds to step S07 to perform first-stage charging. When battery voltage VB reaches target voltage Vc1, PLG-ECU 170 determines that the SOC of power storage device 150 has reached target value SOC1, and causes the first-stage charging to end.

On the contrary, when battery voltage VB is equal to or higher than target voltage Vc1 (YES in step S06), PLG-ECU 170 skips the operation in step S07 and proceeds to step S08.

In step S08, PLG-ECU 170 determines whether or not the scheduled time to start charging in the second stage that is calculated in step S05 is reached. When the scheduled time to start charging in the second stage has not been reached (NO in step S08), PLG-ECU 170 still keeps power storage device 150 in the standby state. In contrast, when the scheduled time to start charging in the second stage is reached (YES in step S08), PLG-ECU 170 performs second-stage charging in step S09. When battery voltage VB reaches target voltage Vc2, PLG-ECU 170 determines that the SOC of power storage device 150 has reached SF, and causes the second-stage charging to end.

[Second Modification]

In the above-described embodiment, the scheduled time to start charging of the second stage is determined by subtracting charging period Tc2 (fixed value) in the second stage from the scheduled time to end charging, and this scheduled time to start charging is used to start and perform the second-stage charging. Accordingly, it is unnecessary to adjust the charging period depending on the remaining battery capacity prior to the start of charging of power storage device 150, and thereby, the control logic for timer charging control can be simplified.

Meanwhile, the remaining battery capacity of power storage device 150 prior to the start of charging varies depending on how electrically powered vehicle 10 has been used and therefore, if charging period Tc2 of the second stage has a fixed value, the SOC may reach a predetermined full state of charge SF before the scheduled time to end charging as shown in FIG. 7. In this case, the SOC is kept at full state of charge SF for a longer period of time, which could cause degradation of power storage device 150 to progress.

In view of the above, the present second modification is given so that the remaining battery capacity of power storage device 150 at the time when travel of electrically powered vehicle 10 is completed is regularly learned, and the learned value of the remaining battery capacity is used to change target value SOC1 of the first-stage charging.

Figure 9:
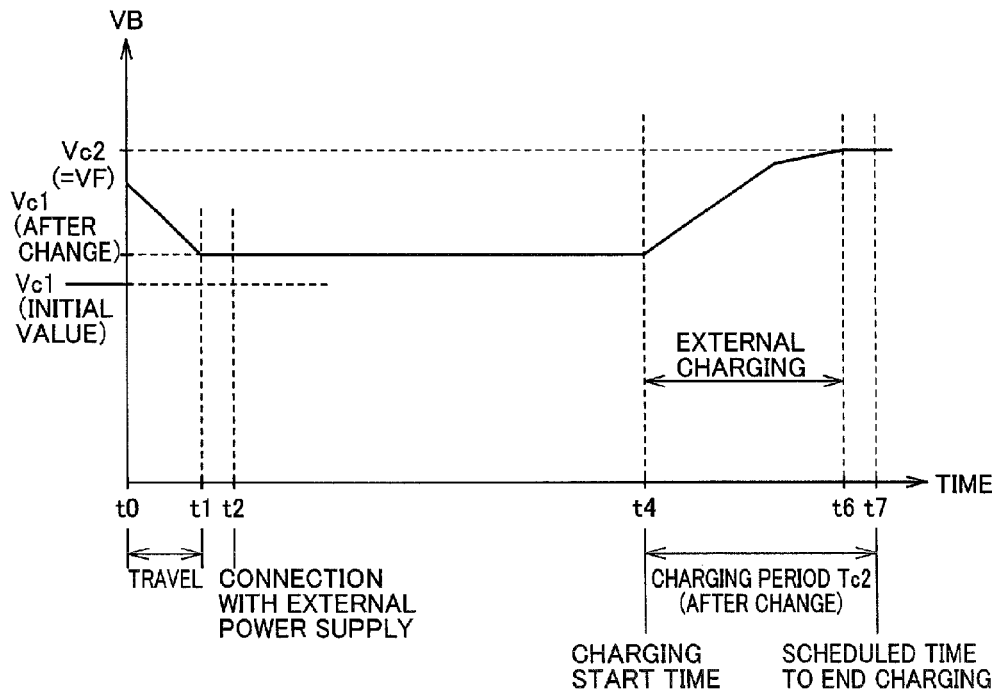
FIG. 9 is a diagram for illustrating a second modification of timer charging control performed by the PLG-ECU.

FIG. 9 is a diagram for illustrating the second modification of timer charging control performed by PLG-ECU 170. FIG. 9 shows a change of battery voltage VB of power storage device 150 with time.

Referring to FIG. 9, each time travel of electrically powered vehicle 10 is completed, PLG-ECU 170 acquires battery voltage VB of power storage device 150 and stores it as a learned value of the remaining battery capacity. PLG-ECU 170 compares the learned value of the remaining battery capacity (learned value of battery voltage VB) with a predetermined target voltage Vc1 (initial value) of the first-stage charging. When PLG-ECU 170 determines that the learned value of battery voltage VB is higher than target voltage Vc1 (initial value), it changes target voltage Vc1 so that the target voltage is identical to the learned value of battery voltage VB. Then, PLG-ECU 170 calculates charging period Tc2 of the second stage based on the changed target voltage Vc1. Accordingly, the changed charging period Tc2 of the second stage is shorter than the charging period Tc2 determined based on target voltage Vc1 (initial value).

In this way, in accordance with the learned value of the remaining battery capacity of power storage device 150, target value SOC1 of the first-stage charging is changed and accordingly charging period Tc2 of the second stage is changed in accordance with the learned value of the remaining battery capacity. As shown in FIG. 9, charging period Tc2 of the second stage is changed in such a manner that makes charging period Tc2 shorter as the learned value of the remaining battery capacity is higher. Thus, power storage device 150 can be charged so that the SOC reaches predetermined full state of charge SF immediately before the scheduled time to end charging. Accordingly, the SOC of power storage device 150 can be prevented from being kept in full state of charge SF for a long period of time and degradation of power storage device 150 due to a high SOC can be suppressed.

[Third Modification]

Figure 10:
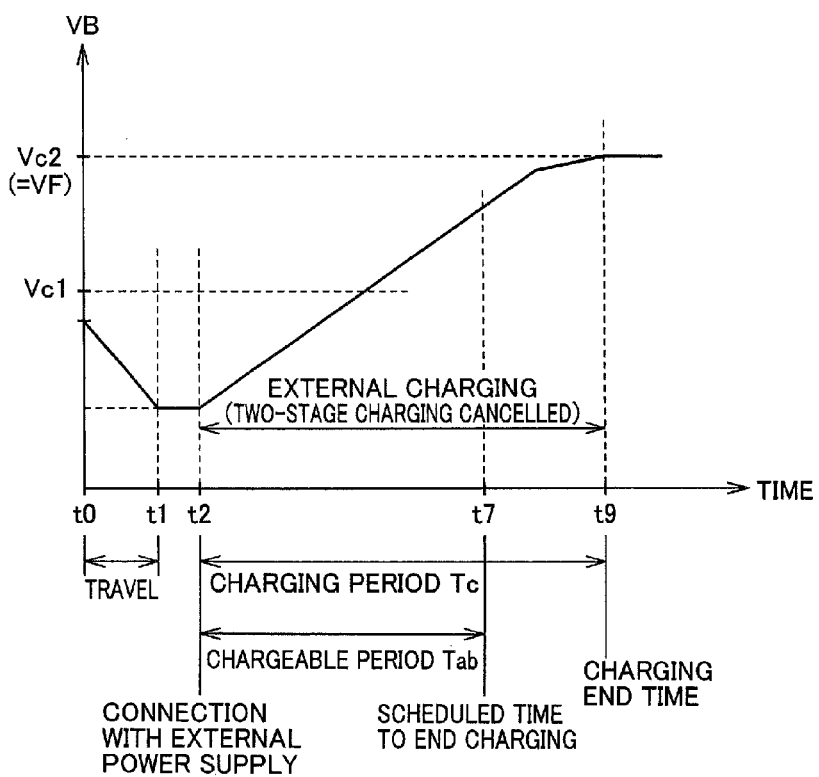
FIG. 10 is a diagram for illustrating a third modification of timer charging control performed by the PLG-ECU.

FIG. 10 is a diagram for illustrating a third modification of timer charging control performed by PLG-ECU 170. FIG. 10 shows a change of battery voltage VB of power storage device 150 with time.

Referring to FIG. 10, in response to connection of electrically powered vehicle 10 with external power supply 402 by charging cable 300 (time t2), PLG-ECU 170 calculates a chargeable period Tab from the present time (time t2) to a scheduled time to end charging (time t7).

Further, based on the remaining battery capacity of power storage device 150 at the present time, PLG-ECU 170 calculates a total charging period Tc to be taken for the SOC of power storage device 150 to reach a predetermined full state of charge SF. More specifically, based on the remaining battery capacity (SOC) at the present time, PLG-ECU 170 calculates a required charging amount ΔQ which is necessary to charge power storage device 150 to predetermined full state of charge SF. Required charging amount ΔQ is calculated by the following Equation (3) where Q represents the full charge capacity of power storage device 150 and SOC represents the remaining battery capacity.

$$\Delta Q = Q \times (S-SOC)/100 \quad (3)$$

As described above in relation with Equation (1), full charge capacity Q in Equation (3) can be corrected so that the state of degradation of power storage device 150 is reflected on full charge capacity Q. Then, based on required charging amount ΔQ calculated by Equation (3) above, PLG-ECU 170 calculates total charging period Tc. Total charging period Tc is calculated by the following Equation (4) where α represents the charging efficiency of power storage device 150.

$$Tc = \Delta Q/Pch \times \alpha + \Delta Tc \quad (4)$$

In Equation (4), the first term of the right side represents a charging period to be taken for power storage device 150 to be charged with charging power Pch=Pc1, and the second term represents a correction term for the charging period. Correction term ΔTc includes, as described above in connection with Equation (2), a variation of the charging period depending on temperature TB of power storage device 150, a charging period to be taken for charging power storage device 150 with charging power Pch=Pc2, and a learned correction value, for example.

PLG-ECU 170 compares chargeable period Tab and total charging period Tc with each other, and determines whether or not timer charging control can be performed, based on the result of the comparison. When total charging period Tc is longer than chargeable period Tab, PLG-ECU 170 determines that timer charging control cannot be performed, namely charging cannot be ended at the scheduled time to end charging.

In such a case, PLG-ECU 170 cancels timer setting made by a user and informs the user of this fact by means of display unit 210 (FIG. 1). Further, PLG-ECU 170 starts causing power storage device 150 to be charged. As shown in FIG. 10, PLG-ECU 170 performs normal charging control instead of two-stage charging. PLG-ECU 170 causes power storage device 150 to be charged so that battery voltage VB reaches VF (target voltage Vc2) corresponding to the SOC=SF. At this time, PLG-ECU 170 causes power storage device 150 to be charged with maximum electric power (rated electric power) which can be supplied from charger 160.

Figure 11:
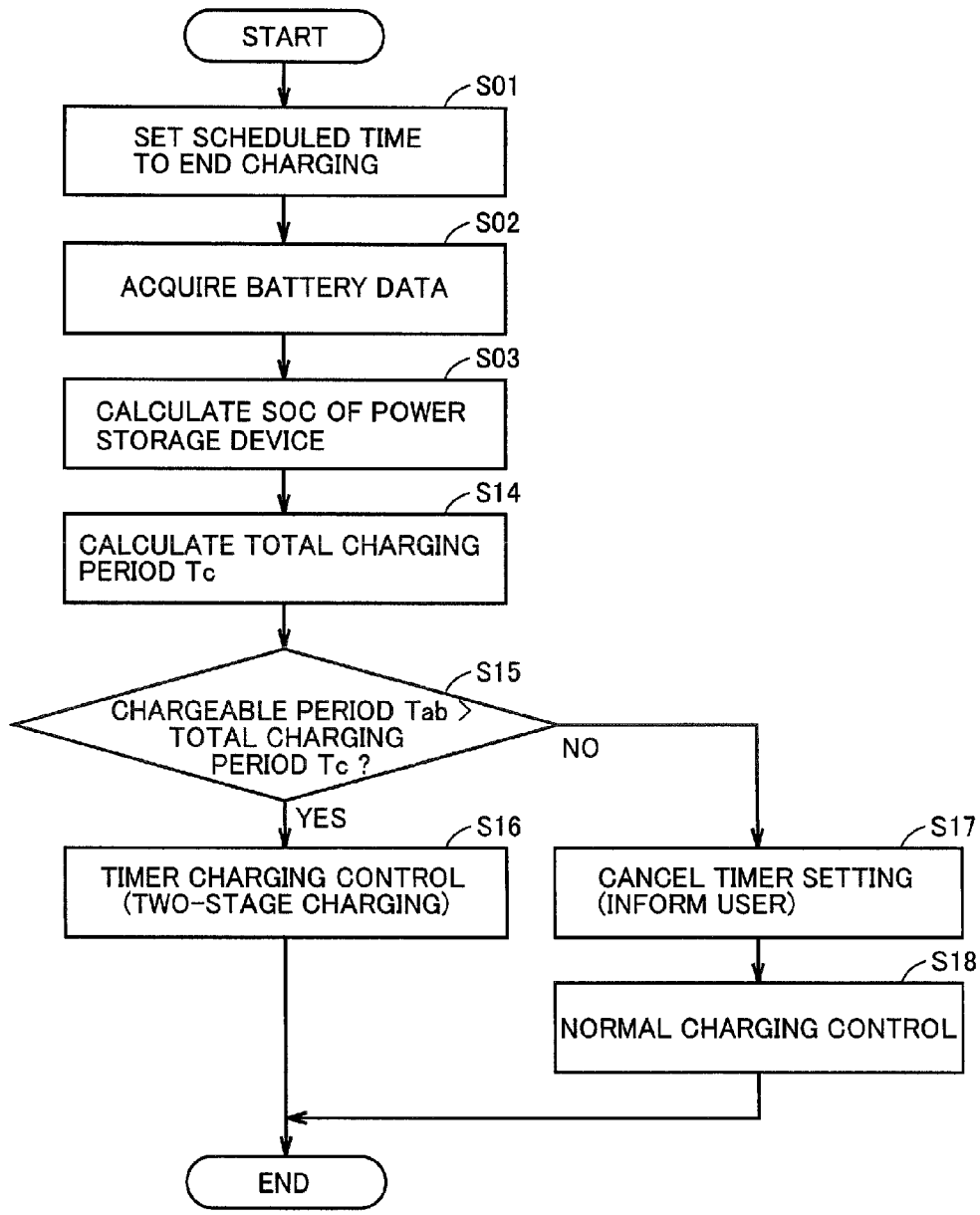
FIG. 11 is a flowchart showing a procedure of a control process for implementing timer charging control in the charging system according to the third modification of the embodiment of the present invention.

FIG. 11 is a flowchart showing a procedure of a control process for implementing timer charging control in the charging system according to the third modification of the embodiment of the present invention.

Referring to FIG. 11, PM-ECU 140 performs steps S01 to S03 similar to those in FIG. 8 to calculate the current SOC of power storage device 150.

Next, in step S14, PLG-ECU 170 uses above Equation (3) to calculate required charging amount ΔQ which is necessary for power storage device 150 to be charged to predetermined full state of charge SF. Then, it assigns the calculated required charging amount ΔQ to Equation (4) to thereby calculate total charging period Tc for power storage device 150.

In step S15, PLG-ECU 170 compares total charging period Tc calculated in step S14 with chargeable period Tab from the current time to the scheduled time to end charging. When chargeable time Tab is longer than total charging period Tc (YES in step S15), PLG-ECU 170 performs timer charging control for power storage device 150 in step S16. This timer charging control is performed in accordance with the process flow shown in FIG. 8.

In contrast, when chargeable period Tab is equal to or shorter than total charging period Tc (NO in step S15), PLG-ECU 170 cancels timer setting and informs the user of this fact by means of display unit 210 in step S17. Further, PLG-ECU 170 performs normal charging control in step S18. Specifically, PLG-ECU 170 causes power storage device 150 to be charged with the rated electric power of charger 160 so that the SOC reaches predetermined full state of charge SF.

As heretofore described, PLG-ECU 170 in the third modification determines, at the time when electrically powered vehicle 10 and external power supply 402 are connected to each other, whether or not charging of power storage device 150 can be ended at the scheduled time to end charging. When PLG-ECU 170 determines that charging cannot be ended at the scheduled time to end charging, PLG-ECU 170 informs the user of this fact and causes power storage device 150 to be charged with the rated electric power of charger 160 without performing timer charging control. In this way, the user can be caused to recognize that power storage device 150 will not reach the predetermined full state of charge at the scheduled time to end charging (the time to start driving the vehicle next time), and electric power can be stored in power storage device 150 as much as possible before the scheduled time to end charging. Accordingly, the drivability and the convenience of electrically powered vehicle 10 can be improved.

Regarding the charging control for power storage device 150 in the above-described embodiment, the first-stage charging corresponds to "first charging operation" of the present invention, and the second-stage charging corresponds to "second charging operation" of the present invention. Further, "controller" of the present invention is implemented by PLG-ECU 170.

While the embodiment has been described above in which the electric vehicle is given, by way of example, as a typical example of the vehicle to which the charging system of the present invention is applied, the present invention is applicable to any vehicle mounted with a power storage device which is configured to be chargeable from a power supply external to the vehicle.

It should be construed that the embodiment disclosed herein is by way of illustration in all respects, not by way of limitation. It is intended that the scope of the present invention is defined by claims, not by the description above, and encompasses all modifications and variations equivalent in meaning and scope to the claims.

INDUSTRIAL APPLICABILITY

The present invention is applicable to a charging system for a vehicle having a timer charging function.

REFERENCE SIGNS LIST 10 electrically powered vehicle; 120 motor generator; 130 drive wheel; 140 PM-ECU; 150 power storage device; 152 monitor unit; 160 charger; 162 AC/DC conversion circuit; 164 DC/AC conversion circuit; 166 isolation transformer; 168 rectification circuit; 170 PLG-ECU; 172, 182 voltage sensor; 184 current sensor; 190 relay; 200 input unit; 210 display unit; 270 vehicle inlet; 300 charging cable; 310 charging connector; 312 switch; 320 plug; 332 CCID relay; 334 control pilot circuit; 340 electrical wire portion; 400 power supply outlet; 402 external power supply; ACL1, ACL2 electric power line

The invention claimed is:

1. A vehicle charging system for controlling charging of a power storage device mounted in a vehicle, the vehicle charging system comprising:
   a charger configured to convert electric power from an external power supply into charging electric power for the power storage device;
   an input unit configured to specify a scheduled time to end charging the power storage device; and
   a controller for controlling the charger so that a state of charge of the power storage device reaches a predetermined full state of charge, the controller including a processor programmed to:
      in response to connection of the vehicle with the external power supply, perform a first charging operation of controlling the charger based on a target value that is set to a state of charge lower than the predetermined full state of charge until the state of charge reaches the target value, the target value being determined in advance based on predicted power consumption;
      after the state of charge reaches the target value, stop charging of the power storage device, and restart charging of the power storage device to perform a second charging operation of controlling the charger so that the state of charge reaches the predetermined full state of charge at the scheduled time to end charging; and
      change the target value in accordance with a learned value of the state of charge at a time when travel of the vehicle is completed, the target value increasing as the learned value of the state of charge increases such that a charging period of during the second charging operation is shorter, wherein
      a duration of the second charging operation depends on a correction value associated with at least a battery temperature and a degradation of the power storage device.

2. The vehicle charging system according to claim 1, wherein
   the controller sets a scheduled time to start the second charging operation based on the scheduled time to end charging and based on a charging period necessary for the state of charge to increase from the target value to the predetermined full state of charge, and restarts charging of the power storage device when the scheduled time to start the second charging operation is reached.

3. The vehicle charging system according to claim 2, wherein
   in a case where the state of charge is higher than the target value at a time when the external power supply and the vehicle are connected to each other, the controller does not perform the first charging operation but performs the second charging operation.

4. The vehicle charging system according to claim 1, wherein
   in a case where the state of charge is higher than the target value at a time when the external power supply and the vehicle are connected to each other, the controller does not perform the first charging operation but performs the second charging operation.

5. The vehicle charging system according to claim 1, wherein
   in a case where a total charging period necessary for the state of charge to reach the predetermined full state of charge is longer than a chargeable period from a present time to the scheduled time to end charging, at a time when the external power supply and the vehicle are connected to each other, the controller does not perform the first and second charging operations but controls the charger so that the state of charge reaches the predetermined full state of charge.

6. A vehicle charging method for controlling charging of a power storage device mounted in a vehicle, the vehicle including: (A) a charger configured to be capable of converting electric power from an external power supply into charging electric power for the power storage device; and (B) an input unit for specifying a scheduled time to end charging the power storage device, the vehicle charging method comprising the steps of:
   performing, in response to connection of the vehicle with the external power supply, a first charging operation of controlling the charger based on a target value that is set to a state of charge lower than a predetermined full state of charge, until the state of charge reaches the target value, the target value being determined in advance based on predicted power consumption;
   after the state of charge reaches the target value, stopping charging of the power storage device, and restarting charging of the power storage device for performing a second charging operation of controlling the charger so that the state of charge reaches the predetermined full state of charge at the scheduled time to end charging; and
   changing the target value in accordance with a learned value of the state of charge at a time when travel of the vehicle is completed, the target value increasing as the learned value of the state of charge increases such that a charging period of during the second charging operation is shorter, wherein
   a duration of the second charging operation depends on a correction value associated with at least a battery temperature and a degradation of the power storage device.

* * * * *